(12) United States Patent
Almanza Rubiano et al.

(10) Patent No.: US 8,633,129 B2
(45) Date of Patent: Jan. 21, 2014

(54) METHOD FOR PRODUCING VANADIUM TRAPS BY MEANS OF IMPREGNATION AND RESULTING VANADIUM TRAP

(75) Inventors: Luis Oswaldo Almanza Rubiano, Piedecuesta (CO); Luis Javier Hoyos Marin, Piedecuesta (CO); Cesar Vergel Hernández, Piedecuesta (CO)

(73) Assignee: Ecopetrol S.A., Bogota (CO)

( * ) Notice: Subject to any disclaimer, the term of this patent is extended or adjusted under 35 U.S.C. 154(b) by 540 days.

(21) Appl. No.: 12/518,043

(22) PCT Filed: Nov. 30, 2007

(86) PCT No.: PCT/IB2007/004311
§ 371 (c)(1),
(2), (4) Date: Mar. 7, 2011

(87) PCT Pub. No.: WO2008/068627
PCT Pub. Date: Jun. 12, 2008

(65) Prior Publication Data
US 2011/0143932 A1   Jun. 16, 2011

(30) Foreign Application Priority Data

Dec. 6, 2006   (CO) .................................. 06123231

(51) Int. Cl.
*B01J 27/00*   (2006.01)
*B01J 23/02*   (2006.01)
*B01J 23/06*   (2006.01)
*B01J 23/70*   (2006.01)
*B01J 23/72*   (2006.01)
*B01J 20/00*   (2006.01)
*C01F 7/02*   (2006.01)

(52) U.S. Cl.
USPC ........... 502/208; 502/341; 502/346; 502/355; 502/414; 502/415; 423/626; 423/628; 423/629

(58) Field of Classification Search
USPC ................ 502/208, 341, 346, 355, 414, 415; 423/626, 628, 629
See application file for complete search history.

(56) References Cited

U.S. PATENT DOCUMENTS

| 4,515,683 A | 5/1985 | Beck et al. |
| 4,900,428 A | 2/1990 | Mester |
| 4,921,824 A | 5/1990 | Chin et al. |
| 4,988,654 A | 1/1991 | Kennedy et al. |
| 5,001,096 A | 3/1991 | Chu et al. |
| 5,002,653 A | 3/1991 | Kennedy et al. |
| 5,015,614 A * | 5/1991 | Baird et al. .................... 502/250 |
| 5,071,807 A | 12/1991 | Kennedy et al. |
| 5,077,263 A | 12/1991 | Henzel |
| 5,304,299 A | 4/1994 | Kumar |
| 5,364,516 A | 11/1994 | Kumar et al. |
| 5,603,823 A | 2/1997 | Kim |
| 6,159,887 A | 12/2000 | Trujillo et al. |
| 6,930,067 B2 * | 8/2005 | O'Connor et al. ............... 502/64 |
| 7,208,446 B2 * | 4/2007 | Stamires et al. ............... 502/355 |
| 8,110,527 B2 * | 2/2012 | Liu et al. ....................... 502/439 |
| 8,197,669 B2 * | 6/2012 | Vierheilig ...................... 208/119 |
| 2011/0152071 A1 * | 6/2011 | Almanza Rubiano et al. ............................ 502/208 |

FOREIGN PATENT DOCUMENTS

| EP | 0 583 025 | 2/1994 | |
| EP | 1 314 474 | 5/2003 | |
| WO | 00/01482 | * 1/2000 | ............... B01J 23/02 |

OTHER PUBLICATIONS

International Search Report for Application No. PCT/IB2007/004311 mailed May 22, 2008.

* cited by examiner

*Primary Examiner* — Patricia L Hailey
(74) *Attorney, Agent, or Firm* — Merchant & Gould P.C.

(57) ABSTRACT

The invention relates to a method for preparing a chemical composition obtained by co-impregnating water-soluble salts Ba/Mg and phosphoric acid $H_3PO_4$ on boehmite alumina which has been calcined in the presence of water vapor. Said chemical composition is used as an additive in the catalytic cracking process in order to capture metals originating from the charge, particularly vanadium, in the presence of $SO_2$ and thus to protect the activity and selectivity of the catalytic cracking catalyst.

15 Claims, No Drawings

METHOD FOR PRODUCING VANADIUM TRAPS BY MEANS OF IMPREGNATION AND RESULTING VANADIUM TRAP

TECHNICAL FIELD

This application is a National Stage Application of PCT/IB2007/004311, filed 20 Nov. 2007, which claims benefit of Serial No. 06123231, filed 6 Dec. 2006 in Colombia and which applications are incorporated herein by reference. To the extent appropriate, a claim of priority is made to each of the above disclosed applications.

The invention provides a process for obtaining chemical compositions capable of processing feedstocks with high metal content, in particular vanadium, in order to capture said metals in the presence of $SO_2$, and in that way preserving the activity and selectivity of the catalytic cracking catalysts in an industrial process unit. Another object of the invention is the compositions produced through said method.

STATE OF THE ART

The irreversible loss of activity in the catalytic cracking catalyst by the action of metals such as vanadium and sodium coming from the hydrocarbon feedstocks is one of the main operational problems of the catalytic cracking units. This destruction of the catalyst which occurs under the highly severe hydrothermal conditions of the regenerator not only diminishes the yield of valuable products, such as gasoline, but significantly increases the production costs by increasing the addition of fresh catalyst to the unit.

Two different approaches for solving this problem have been proposed in the literature, those which improve the resistance to vanadium in the individual components of the catalyst such as zeolites, and matrix, and others in which vanadium traps are added to the catalyst inventory.

Now, the active components of vanadium traps cannot be added as such into an industrial unit due to its poor texture and mechanical strength properties. For that reason vanadium traps are classified into those wherein the active component is added directly onto the catalyst which are named integral particle vanadium trap, and those wherein the active component is deposited on a support for the formation of an independent particle.

An independent particle chemical composition is constituted by a support, an active phase and a binder. The support is useful for providing the trap mechanical strength and texture properties such as specific surface area, pore volume, and average pore diameter, while the binder's function as its name indicates is to maintain a firm cohesion between the support and the active component, thus securing the morphologic and mechanical resistance to attrition properties of the final product.

Among the different patented active components for vanadium traps in the literature the rare earth oxides are highlighted for being applied at an industrial level, specifically $La_2O_3$ (U.S. Pat. Nos. 5,603,823, 5,077,263, 5,001,096, 4,900,428, 4,515,683, 4,921,824, 5,304,299 and 5,364,516). Nevertheless, after different industrial testing with additive RV4, based on $La_2O_3$ [1], its ability for neutralizing the disrupting effect of vanadium on the catalyst inventory has been reported at only 20%.

Other industrially used active components correspond to alkaline earth metal oxides such as MgO and CaO, pure or mixed with materials containing calcium and magnesium such as dolomite and sepiolite, added to the catalyst formulation, (U.S. Pat. No. 4,988,654) or as additives in independent particles (U.S. Pat. Nos. 5,002,653 and 5,071,807). There are not available results of industrial tests in these additives, although it has been stated in lab tests with $SO_2$ that alkaline earth metals such as MgO do not show any capacity for catching vanadium.

The barium $Ba_2P_2O_7$ (PBA) and calcium $Ca_2P_2O_7$ (PCA) pyrophosphates have been reported as active components capable of neutralizing the destruction effect of vanadium through an oxidation-reduction REDOX mechanism. This mechanism is different to the acid-base mechanism reported in the literature wherein the active components, in the great majority basic in nature, react with vanadium oxides having acid nature. This REDOX mechanism would avoid the unwanted neutralization reaction of the active component with sulphur acid oxides $SO_x$ present in an industrial regenerator.

U.S. Pat. No. 6,159,887, which reports for the first time the use of PBA and PCA as active agents on vanadium traps, reports its preparation by deposition on different supports, such as: alumina, silica, magnesium oxide, alumina silicate, among others. Different preparations made allowed to demonstrate that PBA supported on silica, alumina or silica-alumina completely decomposes into different types of phosphates such as $Ba_3(PO_4)_2$, $AlPO_4$, $BaHPO_4$, and $Ba_8Al_2O_{11}$. These oxides do not show any capacity to catch vanadium in the presence of $SO_x$. In the case of MgO as support, this shows a low surface area and a high tendency to sintering in presence of water.

On the other hand, trap preparations based on PBA using different binders commonly used in the preparation of FCC catalysts such as Chlorhydrol or the sodium silicate also allowed to show, by DRX diffraction spectrum analysis of these preparations, that PBA decomposes to give rise to different aluminum and silica oxides with phosphorous and barium.

Those results prove that in the state of the art related to catalyst preparation there is no solution to all the drawbacks involved in preparing vanadium traps based on barium and calcium pyrophosphates for the catalytic cracking process. It seems that the high reactivity of PBA and PCA with the actives sites of the supports based on alumina and silica favors its destruction.

These background leads to the conclusion that there are no vanadium traps in the market capable of neutralizing the destructive effect of vanadium in the presence of $SO_2$, and the phases that could solve this problem such as PBA and PCA are highly reactive with the supports and binders used in catalyst preparation.

As PBA or PCA are the most promising agents for capturing vanadium in the presence of $SO_x$, at least in the laboratory, but break down when used at an industrial level, it would be desirable to count on a trap or method that allows the production of a trap which overcome the previous mentioned drawbacks.

The present invention provides a process for preparing vanadium traps which not only overcomes the above exposed inconvenience but proves to be capable of protecting the catalyst in the processing of heavy feedstocks in catalytic cracking units, better than any other catalyst existing in the state of the art.

DESCRIPTION OF THE INVENTION

The claimed invention is useful in hydrocarbon catalytic cracking process where the vanadium present in the charge poisons and destroys the catalyst components used in the process, reducing their activity and the yield of valuable products such as gasoline.

In order to avoid catalyst poisoning and destruction it is necessary to use chemical compositions which compete with the catalyst for vanadium. In this invention, it was found that the application of $Ba/Mg/H_3PO_4$ compositions on alumina allow them to react with vanadium thus forming stable compounds under the conditions of a catalytic cracking process, in the presence of other acid gases such as $SO_2$.

The challenge in the preparation of independent particle vanadium traps lays in preserving and when possible increasing the vanadium capture capacity of the active component deposited on a support, generating the necessary shape, particle size and attrition resistance for supporting the extreme conditions of the FCC catalytic cracking process (Fluid Catalytic Cracking). The adequate election of support and binder is determinant in the performance of the chemical composition. The interaction active component-binder, or active component-support can give rise to forming new inactive compounds for catching vanadium.

It has been established that the use of alumina and magnesium oxide mixtures preferably magnesium aluminate in its spinel phase as PBA support allows the preservation of its structure during the preparation process. Furthermore, it has been established that the best results can be observed at PBA particle sizes less than 5 µm, preferably less than 1 µm.

This result makes evident the direct dependence between particle size of the active component and the efficiency of the vanadium traps. As well as in heterogeneous catalysis the best results will be obtained with the greatest exposed active area, that is, at the maximum dispersion and accessibility of the active compound.

Taking into account the above facts, the applicant proposes a preparation method of an additive which maximizes the dispersion of the active component on a support and for that it is based on the impregnation of $Ba(NO_3)_2$ or $BaCl_2$, $Mg(NO_3)_2$ type magnesium salts and phosphoric acid on the support. Thus, the trap preparation process herein claimed comprises the co-impregnation of different soluble salts of barium and magnesium of the nitrate or chloride type and phosphoric acid, on a type bohemite alumina, gibbsite, hydrargillite and/or mixtures thereof previously calcinated with water vapor.

In that order of ideas, we claim the process comprising the formation of a aluminum hydroxide suspension of the bohemite, gibbsite, hydrargillite type and/or mixtures thereof previously peptidized, the formation of support micro-spheres through spray drying of said suspension, the calcination of the micro-spheres in the presence of steam, and the impregnation of barium salts of the $Ba(NO_3)_2$ or $BaCl_2$ type, $Mg(NO_3)_2$ type magnesium salts and phosphoric acid on the alumina calcinated microspheres. Also, the chemical composition obtained through said method is also a part of the invention.

Preferably, the process of the invention starts from a suspension of aluminum hydroxide which is treated with a 45% formic acid solution during some time. Then the suspension is dried to form support micro-spheres in a spray dryer.

Then these micro-spheres are treated in an air/steam stream at a temperature between 500 and 800° C. during a period of time which oscillates between 1 and 4 hours, followed by a treatment of 1 hour under dry air at the same temperature.

The micro-spheres of the support thus treated are simultaneously impregnated with a solution made of $H_3PO_4$, $Ba(NO_3)_2$ and $Mg(NO_3)$ in such manner that the active component expressed as $BaO/NgO/PO_4$ will have a total concentration between 10% and 60% by weight and that the atomic ratio P/(Ba+Mg) is equal to or greater than 0.5 and the atomic ratio Mg/Ba is equal or greater than 1. The impregnation pH must be held equal to or lower than 3.5.

Preferably, the composite solution used for impregnating the micro-spheres comprises between 10 and 30 parts of barium expressed as BaO, between 10 and 30 parts of magnesium expressed as MgO and between 30 to 60 parts of $Al_2O_3$.

Finally, the impregnated support is dried at 90° C. and calcined at a temperature from 750 to 820° C. during 4 hours. The amount of micro-spheres added to the cracking catalyst is from 5 to 20%.

The following examples are given to illustrate the application and advantages of this invention. In no time said examples are given to limit the invention.

Example 1

For preparing 80 g of the support the following is used:

| | |
|---|---:|
| aluminum hydroxide type bohemite | 100 g. |
| 98% Formic acid | 55.1 g. |
| Sodium hexametaphosphate $(NaPO_4)_6$ | 0.3 g. |
| demineralized water | 178.2 g. |

The dispersant agent $(NaPO_4)_6$ is added to demineralized water, then formic acid is added. Then aluminum hydroxide is added to form a 30% suspension by weight, and then it is vigorously agitated during a certain maturation time. After that the suspension is taken to the loading container of the aspersion dryer. The suspension micro-drops are dried through a hot air parallel flow stream.

The calcination of the support micro-spheres is carried out in a fixed bed and continuous flow reactor, wherein the solid is heated in a hot air stream until a temperature between 500 and 800° C., preferably 700° C., has been reached, once it occurs, the stream is changed to an air/steam mixture at the same temperature for 4 hours. Then, the solid is contacted again with dry air for one more hour, and then it is cooled to room temperature.

Example 2

For preparing 18 g of the prototype the following is used:

| | |
|---|---:|
| Support prepared in example 1 | 12 g. |
| A $Ba(NO_3)_2$ saturated solution | 121.52 g. |
| 85% by weight of $H_3PO_4$ solution | 15.27 g. |
| $Mg(NO_3)_2$ | 12.49 g. |
| 80% by weight of aqueous acetic acid solution | 93.5 g. |
| demineralized water | 146 g. |
| $NH_4OH$ solution | |

The $Mg(NO_3)_2$ is placed in a solution with 146 g of water, in order to be mixed with the solution of $Ba(NO_3)_2$, with $H_3PO_4$ and with the acetic acid. The pH of this solution is set with a concentrated $NH_4OH$ solution, until a value greater than 3, preferably 3.4, is reached. Finally, the solution is impregnated through incipient impregnation technique.

The impregnated support is dried at 90° C., and then burned at 800° C. during 4 hours.

Trap Evaluation through CPS Cycles in Presence of $SO_2$.

The mixtures of commercial catalyst and trap and 6000 ppm of vanadium (100 g) are submitted in a fluidized bed to a reduction-oxidation cyclic deactivation process (40 cycles).

After calcination in a muffle furnace and after reaching the deactivation temperature, a nitrogen stream is passed through the bed for 10 minutes in order to evacuate the oxygen adsorbed on the catalyst. In a second step a stream comprising 50% propylene and 50% steam is passed through the fluidized bed of catalyst during another 10 minutes. Then, the catalyst is again evacuated with a nitrogen stream for 10 minutes, and finally treated with a stream comprised of 50% air containing 4% $SO_2$ by volume and 50% steam. This procedure is repeated 40 times. During the whole procedure the temperature remains constant at 788° C.

Table 1 shows the micro activity test (MAT) results of the catalyst with 0.6% by weight of vanadium and with 0% vanadium, and the catalyst mixture with 10% by weight of the prepared vanadium trap prototype plus 0.6% by weight of vanadium.

TABLE 1

MAT results of deactivations CPS prototypes prepared through impregnation (vanadium content 6000 ppm)

| Compound | CAT | CAT + 0.6% V | CAT + support + 0.6% V | CAT + prototype + 0.6% V |
|---|---|---|---|---|
| H2 | 0.17 | 0.29 | 0.35 | 0.35 |
| Dry gas | 1.7 | 2.56 | 2.62 | 1.89 |
| LPG | 11.59 | 10.05 | 9.42 | 10.53 |
| C5-220° C. | 49.4 | 45.4 | 44.99 | 46.84 |
| ALC | 21.17 | 21.68 | 23.06 | 22.26 |
| Clarif. Oil | 11.5 | 15.32 | 15.03 | 13.28 |
| Coke | 4.62 | 4.99 | 4.87 | 5.20 |
| Conversion X % | 67.3 | 63 | 61.9 | 64.46 |
| LPG + gasoline | 60.99 | 55.45 | 54.41 | 57.37 |
| Zeolite area $M^2/g$ | 112 | 91 | 84.6 | 95.3 |
| % Protection | 100 | 0 | 0 | 34.7 |
| % LPG protection | 100 | 0 | 0 | 31.2 |
| % Gasoline protection | | | | 36.0 |

The invention claimed is:

1. A process for preparing chemical compositions useful in a hydrocarbon catalytic cracking process the process comprising:
   a. producing alumina support micro-spheres from an aluminum hydroxide suspension of bohemite, gibbsite, hydrargillite hydroxides and/or mixtures thereof;
   b. calcinating the alumina micro-spheres;
   c. impregnating barium salts of $Ba(NO_3)_2$ or BaCl2, magnesium salts of $Mg(NO_3)_2$ and phosphoric acid in solution on the calcinated alumina micro-spheres;
   d. drying the impregnated micro-spheres; and
   e. mixing the dried and impregnated micro-spheres with a catalytic cracking catalyst.

2. The process according to claim 1 wherein the alumina support micro-spheres are produced from a previously peptizised aluminum hydroxide suspension, which is dried through spray drying thus forming the support micro-spheres and calcinated in the presence of steam.

3. The process according to claim 2 wherein the suspension for producing the support micro-spheres has a 30% aluminum hydroxide concentration.

4. The process according to claim 2 wherein the aluminum hydroxide suspension is peptizised with a 45% formic acid solution.

5. The process according to claim 3, wherein the aluminum hydroxide suspension is formed by adding $(NaPO_4)_6$ as dispersant to water prior to adding the aluminum hydroxide to the water.

6. The process for preparing chemical compositions according to claim 1, wherein the support micro-spheres are produced from an aluminum hydroxide suspension which is treated with a 45% formic acid solution, then is dried by aspersion to form the support micro-spheres, which are then submitted to an air/steam stream at a temperature between 500 and 800° C. during a period of time from 1 to 4 h and finally treated in dry air at the same temperature for 1 hour.

7. The process for preparing chemical compositions according to claim 1 wherein the support micro-spheres are simultaneously impregnated with a solution comprising $H_3PO_4$, $Ba(NO_3)_2$, $Mg(NO_3)$ and an aqueous acetic acid solution.

8. The process for preparing chemical compositions according to claim 1, wherein the impregnation is carried out with a solution made of three individual and independent solutions of $H_3PO_4$, $Ba(NO_3)_2$ and $Mg(NO_3)$.

9. The process for preparing chemical compositions according to claim 8 wherein the atomic ratio of P/(Ba+Mg) is equal or greater than 0.5 and the atomic ratio of Mg/Ba is equal or greater than 1.

10. The process for preparing chemical compositions according to claim 7, wherein the pH of the solution prior to impregnation must be kept between 2.5 and 5.

11. The process for preparing chemical compositions according to claim 10 wherein the pH is set with $NH_4OH$.

12. The process for preparing chemical compositions according to claim 1, wherein the impregnated support micro-spheres are dried at 90° C. and calcinated at a temperature between 750 and 820° C. during 4 hours.

13. The process for preparing chemical compositions according to claim 1 wherein the amount of support micro-spheres added to the catalytic cracking catalyst is from 5 to 20%.

14. A chemical composition useful in a hydrocarbon catalytic cracking process, wherein the composition is prepared through the process defined in claim 1 and comprises an active component expressed as $BaO/MgO/PO_4$, the active component comprising a total concentration between 10% and 60% by weight of the chemical composition.

15. The chemical composition according to claim 14 wherein the composition comprises between 10 to 30 parts of barium expressed as BaO, between 10 to 30 parts of phosphorus expressed as $PO_4$, between 10 to 30 parts of magnesium expressed as MgO and between 30-60 parts of $Al_2O_3$.

* * * * *